UNITED STATES PATENT OFFICE.

HOWARD SPENCE AND HERBERT WRIGLEY, OF MANCHESTER, ENGLAND, ASSIGNORS TO COMPANY OF PETER SPENCE & SONS LIMITED, OF MANCHESTER, ENGLAND.

TITANIUM COMPOUNDS.

1,255,807.  Specification of Letters Patent.  Patented Feb. 5, 1918.

No Drawing.  Application filed December 11, 1914. Serial No. 876,666.

*To all whom it may concern:*

Be it known that we, HOWARD SPENCE and HERBERT WRIGLEY, both subjects of the King of Great Britain and Ireland, and both residents of Manchester, in the county of Lancaster, England, have invented new and useful Improvements in Titanium Compounds, of which the following is a specification.

For use in the arts the titanium salt which has found most general employment is the double oxalate of titanium and potassium of the type $TiOC_2O_4K_2C_2O_4$ which shows greater stability in solution and has greater advantages in employment than titanium salts of other acids which have been commercially produced.

Owing to the difficulty of obtaining a stable merchantable compound by direct solution of titanic oxid in a small quantity of oxalic acid it has hitherto not been practicable to substitute for titanium potassium oxalate an oxalate containing a lower ratio of oxalic acid to titanic oxid.

We have now found that stable merchantable forms of oxalate of titanium can be produced which have a molecular ratio of $C_2O_3$ to $TiO_2$ of about 1 to 1, and in addition to having the desired properties for commercial employment to not require the presence of the expensive and otherwise inert neutral alkali oxalate to produce the necessary stability, and can therefore be manufactured at a materially reduced cost.

In carrying our invention into effect we may employ a titanium double sulfate of the type $TiOSO_4X_2SO_4$, where X stands for Na, K or $NH_4$, and by double decomposition in an aqueous solution containing an alkali oxalate we obtain a salt essentially consisting of $TiO_2C_2O_3$ together with an inert alkali sulfate. As alkali oxalate we preferably employ sodium oxalate, or oxalic acid and soda—in about the ratio of $C_2O_3$ to $Na_2O$. Instead of an alkali oxalate oxalic acid having the formula $H_2C_2O_4 2H_2O$ may be utilized in the same proportion as the sodium oxalate or other oxalic compound is used.

The substances mentioned may be mixed together in a dry state to provide a suitable titanium oxalate mixture which, when in an aqueous solution, will suffer double decomposition as described, the mixture being stable and in a form in which it may be marketed.

We may, if desired, also employ for admixture with either oxalic acid or neutral alkali oxalate, in the indicated ratio of about one molecule $C_2O_3$ to one molecule $TiO_2$, titanic acid in solution in as little sulfuric acid as possible or in the form of a solid soluble basic titanic sulfate.

We prefer to employ a titanium alkali sulfate salt or a solution or salt of titanium sulfate in which the ratio of $TiO_2$ to $SO_3$ combined with it is as close to 1 to 1 as possible: the proportions broadly being regulated so that the ratio of $TiO_2$ to $C_2O_3$ in the product shall be approximately 1 to 1.

It is intended in the claims that the expression "soluble oxalate" will include oxalic acid as well as its soluble salts.

What we claim is:—

1. A mixture composed of basic titanium sulfate, a soluble alkali sulfate and a soluble oxalate, which mixture has the property of suffering double decomposition in an aqueous solution with the formation of a titanium oxalate in which the ratio of $TiO_2$ to $C_2O_3$ is about 1 to 1 and a soluble alkali sulfate.

2. In the process of producing stable titanium oxalate, the step which comprises subjecting basic titanium sulfate, a soluble alkali sulfate and a soluble oxalate to double decomposition in an aqueous solution with the formation of titanium oxalate in which the ratio of $TiO_2$ to $C_2O_3$ is about 1 to 1.

3. The process of producing stable titanium oxalate in which the ratio of $TiO_2$ to $C_2O_3$ is about 1 to 1 which comprises adding to basic titanium sulfate in an aqueous solution about one molecular proportion of available oxalic acid.

4. A titanium oxalate stable in an aqueous solution in which the molecular proportion of $TiO_2$ to $C_2O_3$ is about 1 to 1.

In witness whereof we have hereunto set our hands in the presence of two subscribing witnesses.

HOWARD SPENCE.
HERBERT WRIGLEY.

Witnesses:
FRANK A. HEYS,
ERNALD SIMPSON MOSELEY.